(12) United States Patent
Matsukawa et al.

(10) Patent No.: US 8,469,673 B2
(45) Date of Patent: Jun. 25, 2013

(54) ELECTRIC COMPRESSOR

(75) Inventors: Tadahiro Matsukawa, Nagoya (JP); Takayuki Takashige, Kiyosu (JP); Kenichi Aiba, Nagoya (JP); Koji Toyama, Nagoya (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 349 days.

(21) Appl. No.: 12/442,584

(22) PCT Filed: Mar. 14, 2008

(86) PCT No.: PCT/JP2008/054749
§ 371 (c)(1),
(2), (4) Date: Mar. 24, 2009

(87) PCT Pub. No.: WO2008/114726
PCT Pub. Date: Sep. 25, 2008

(65) Prior Publication Data
US 2010/0086413 A1    Apr. 8, 2010

(30) Foreign Application Priority Data
Mar. 19, 2007   (JP) .................................. 2007-070963

(51) Int. Cl.
*F04B 49/06*   (2006.01)
(52) U.S. Cl.
USPC ............................. 417/18; 417/44.1; 417/208
(58) Field of Classification Search
USPC ................ 417/18, 44.1, 19, 208, 373
See application file for complete search history.

(56) References Cited

U.S. PATENT DOCUMENTS

| 4,227,862 A * | 10/1980 | Andrew et al. ................. 417/12 |
| 5,553,997 A * | 9/1996 | Goshaw et al. ................. 415/17 |
| 2003/0098298 A1* | 5/2003 | Dohmae et al. ............... 219/209 |
| 2004/0020227 A1* | 2/2004 | Takemoto et al. .............. 62/229 |

FOREIGN PATENT DOCUMENTS

| JP | 58-160571 U | 10/1983 |
| JP | 58-182961 U | 12/1983 |
| JP | 60-68341 U | 5/1985 |
| JP | 60-92060 U | 6/1985 |
| JP | 62-258964 A | 11/1987 |

(Continued)

OTHER PUBLICATIONS

International Search Report of PCT/JP2008/054749, Mailing Date of May 27, 2008.

(Continued)

*Primary Examiner* — Anh Mai
*Assistant Examiner* — Fatima Farokhrooz
(74) *Attorney, Agent, or Firm* — Westerman, Hattori, Daniels & Adrian, LLP

(57) ABSTRACT

There is provided an electric compressor capable of being actuated rapidly. During the time when the operation of an automotive air conditioner is stopping, by heating a motor 12, a refrigerant on the outlet side 11b of a compressor body 11 is heated. Thereby, the temperature of refrigerant on the outlet side 11b is raised, and the refrigerant is prevented from being liquefied on the outlet side 11b of the compressor body 11, by which the automotive air conditioner can be actuated rapidly. Besides, by rotating the motor 12 at the number of revolutions lower than that at the time of normal operation, the refrigerant liquefied on the outlet side 11b of the compressor body 11 may be pushed out.

4 Claims, 2 Drawing Sheets

FOREIGN PATENT DOCUMENTS

| | | |
|---|---|---|
| JP | 63-87474 U | 6/1988 |
| JP | 9-79669 A | 3/1997 |
| JP | 11-159467 A | 6/1999 |
| JP | 2000-104689 A | 4/2000 |
| JP | 2004-028503 A | 1/2004 |
| JP | 2005-326054 A | 11/2005 |

OTHER PUBLICATIONS

Japanese Office Action dated Jan. 30, 2013, issued in corresponding Japanese Patent Application No. 2007-070963, with English translation (7 pages).

* cited by examiner

ELECTRIC COMPRESSOR

TECHNICAL FIELD

The present invention relates to an electric compressor constituting an air conditioner.

BACKGROUND ART

Conventionally, in an automotive air conditioner, the driving force of an automotive engine has been used to drive a compressor for compressing a refrigerant. In contrast, with the recent practical use of electric vehicles and the like, what is called an electric compressor, in which an electric motor is used as a driving source for the compressor, has been developed.

In such an electric compressor, the driving torque produced by the motor is lower than that produced by the engine. Especially at the time of actuation, the driving torque required by the motor is high, so that the compressor cannot sometimes be actuated depending on the state of refrigerant at the front and rear of the compressor. After the operation has been stopped, the temperature of refrigerant decreases. If the refrigerant that has been in a gasified state at the time of operation is liquefied on the outlet side of compressor due to the decrease in temperature, the density of refrigerant is far higher than that of refrigerant in the gasified state. The reason for this is that the motor load that is going to actuate the compressor becomes excessive, so that, in a motor drive control circuit, an overcurrent protecting function for protecting the motor is triggered.

Such a phenomenon is remarkable especially when heating operation is going to be performed in a state of low open-air temperature. Accordingly, a technique has been proposed in which a dc current is supplied to the coil of motor stator to generate heat in the coil, by which the compressor is preheated (for example, refer to Patent Document 1).

Patent Document 1: Japanese Patent Laid-Open No. 2005-326054

DISCLOSURE OF THE INVENTION

Problems to be Solved by the Invention

However, even in the technique proposed in Patent Document 1, time is required to perform preheating and to start the heating operation.

For example, in the case where a long period of time has been elapsed after the air conditioner was stopped, if the refrigerant on the outlet side turns from a gas state to a liquid state, preheating takes much time, and the time to when the compressor is finally actuated to perform the heating operation of air conditioner normally is prolonged. In the case of the automotive air conditioner, there is a user's need for accomplishing the actuation rapidly and for performing powerful operation from immediately after the actuation. Therefore, it is desired to start the compressor rapidly under any condition, and in this respect, there is room for further improvement.

The present invention has been made to solve the above technical problems, and accordingly an object thereof is to provide an electric compressor capable of being actuated rapidly.

Means for Solving the Problems

The present invention made to achieve the above object provides an electric compressor comprising a compressor body constituting an air conditioner; a motor for driving the compressor body; and a control section for controlling the operation of the motor, characterized in that, during the time when the operation of the electric compressor is stopping, the control section automatically performs actuation load reducing processing for reducing a load at the time when the compressor body is actuated by the motor.

By automatically performing the actuation load reducing processing during the time when the operation of the electric compressor is stopping, the presence of a refrigerant in a liquefied state on the outlet side of the compressor body is eliminated, and the electric compressor can be started rapidly at the time of the next actuation of the electric compressor.

In the actuation load reducing processing, a method in which the refrigerant liquefied on the outlet side of the compressor body is vaporized or a method in which the refrigerant liquefied on the outlet side of the compressor body is pushed out can be employed.

In the case where, in the actuation load reducing processing, the refrigerant liquefied on the outlet side of the compressor body is vaporized by heating the compressor body, any method may be employed to heat the compressor body. However, a method as described below is preferably employed. The control section comprises a switching element for supplying an alternating current from a dc power source to each of three-phase coils of the motor to rotationally drive the motor. Therefore, in the actuation load reducing processing, the alternating current is supplied from the switching element to only the single-phase coil of the three-phase coils of the motor, and by generating heat in the coil, the refrigerant liquefied on the outlet side of the compressor body is vaporized.

Besides, by rotationally driving the motor for a preset period of time, the refrigerant liquefied on the outlet side of the compressor body may be pushed out. At this time, since the purpose is only to push out the refrigerant liquefied on the outlet side of the compressor body, the number of revolutions of the motor can be made lower than the number of revolutions at the time of normal operation, and also the rotational driving time may be short.

During the time when the operation of electric compressor is stopping, the control section can perform the actuation load reducing processing each time preset time has elapsed. Also, the control section may perform the actuation load reducing processing at every preset time.

Also, during the time when the operation of electric compressor is stopping, the actuation load reducing processing may be performed when the open-air temperature is lower than a preset temperature.

Advantages of the Invention

According to the present invention, the actuation load reducing processing in which the refrigerant liquefied on the outlet side of the compressor body is vaporized or the refrigerant liquefied on the outlet side of the compressor body is pushed out is performed automatically during the time when the operation of electric compressor is stopping, by which the load at the time when the compressor body is actuated is reduced, and therefore the electric compressor can be actuated rapidly.

DESCRIPTION OF SYMBOLS

10 . . . electric compressor, 11 . . . compressor body, 11b . . . outlet side, 12 . . . motor, 13 . . . control board (control section), 14 . . . switching element, 15 . . . control unit, 20 . . . preheat control section

BEST MODE FOR CARRYING OUT THE INVENTION

The present invention will now be described in detail based on an embodiment shown in the accompanying drawings.

Figure 1:
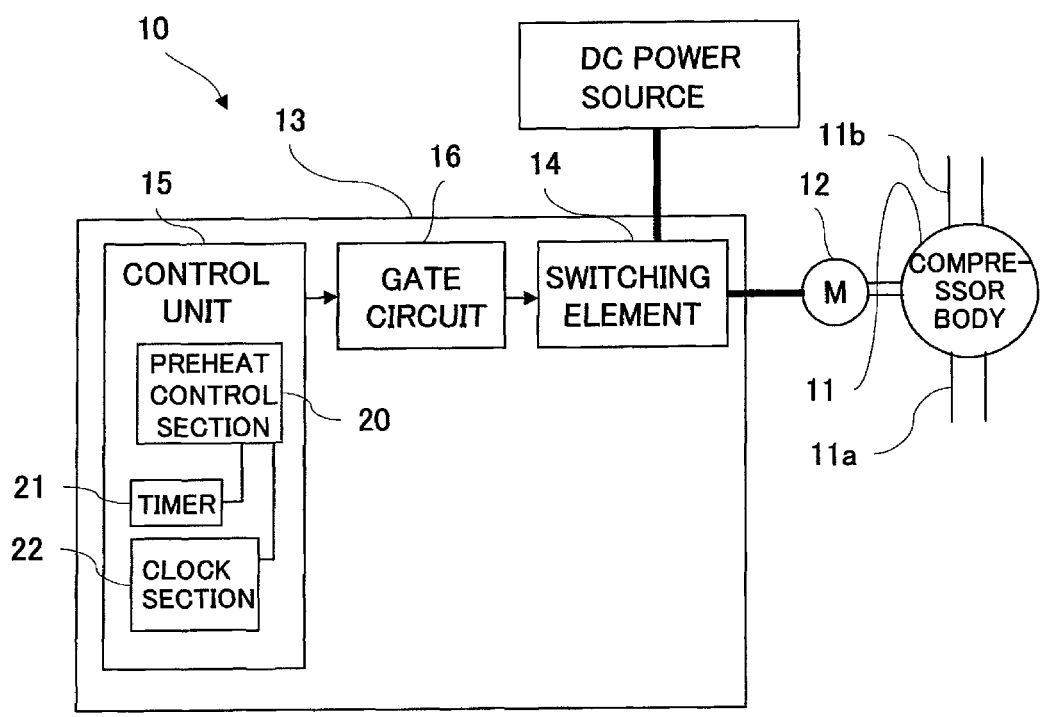
FIG. 1 is a block diagram showing a general configuration of an electric compressor in accordance with an embodiment.

FIG. 1 is a block diagram for describing the configuration of an electric compressor 10 for an automotive air conditioner in accordance with this embodiment.

As shown in FIG. 1, the electric compressor 10 comprises a compressor body 11 for compressing a refrigerant sucked from the inlet side 11a and sending the compressed refrigerant to the outlet side 11b, a motor 12 for driving the compressor body 11, and a control board (control section) 13 for rotating the motor 12.

The control board 13 comprises a switching element 14 for converting a voltage supplied from a dc power source into an alternating current, a control unit 15 comprising a microcomputer for controlling the operation of the switching element 14, and a gate circuit 16. The gate circuit 16 is driven by the control of the control unit 15, and the drive signal thereof is input to the switching element 14, by which the switching element 14 is operated. Thereby, the voltage supplied from the dc power source is applied to the motor 12 of the electric compressor 10 as a three-phase alternating current, by which the motor 12 is rotationally driven.

The control unit 15 has, as a function, a preheat control section 20 for heating the compressor body 11 during the operation of the automotive air conditioner is stopping to prevent the refrigerant, which has been liquefied on the outlet side 11b of the compressor body 11, from being present.

The control unit 15 automatically performs processing for heating the compressor body 11 (hereinafter, referred to as compressor preheating processing (actuation load reducing processing)), for example, at fixed time intervals during the time when the operation of the automotive air conditioner is stopping (including the state in which the main key of automobile is OFF). The compressor preheating processing can be performed at preset fixed time intervals such as every one hour or every two hours by using a timer 21 incorporated in the control unit 15 as a trigger. For this purpose, in the timer 21, the counting of elapsed time from when the operation of automotive air conditioner is stopped is started based on the information indicating the operating state sent from a host control unit for controlling the whole of the automotive air conditioner, and a trigger signal is delivered to the control unit 15 each time the count value reaches a preset value.

Also, the control unit 15 can automatically perform the compressor preheating processing, for example, at the same time every day. The processing for heating the compressor body 11 can be performed at the same time every day by using a clock section 22 incorporated in the control unit 15 as a trigger. For this purpose, in the clock section 22, a trigger signal is delivered to the control unit 15 when preset time arrives.

The time when the trigger signal is generated in the clock section 22 may be set in advance at the shipping stage, or may be made capable of being set arbitrarily by the user. Further, the control unit 15 is provided with a learning function, and the history information indicating the time when the user uses the automobile is accumulated, by which the compressor preheating processing can be automatically performed, for example, from six o'clock in the morning one hour before the time obtained from the history information that the automotive air conditioner is actuated (the automotive engine is actuated) at seven to eight o'clock in the morning every day.

Further, the control unit 15 may be configured so as to automatically perform the above-described compressor preheating processing when the open-air temperature is not higher than a preset threshold value. In this case, based on the open-air temperature data detected by an open-air temperature sensor provided in the automotive air conditioner, it is judged whether the compressor preheating processing is performed.

Also, in the control unit 15, the operating state at the time when the automotive air conditioner was previously stopped is stored, and the compressor preheating processing can also be performed "in the case where heating is ON at the stop time", "in the case where the open-air temperature is lower than the preset threshold value at the stop time", or in the like case.

Besides, the compressor preheating processing can also be performed by using the user's action on the control unit 15 as a trigger. For example, the configuration is made such that the user can set so as to determine whether or not the compressor preheating processing is performed during the time when the automotive air conditioner is stopping. In this case, a user who desires to start heating operation rapidly performs setting using a button or the like so that the compressor preheating processing is performed during the time when the automotive air conditioner is stopping, and the control unit 15 can perform the compressor preheating processing as described above as the result of the user's setting.

The compressor preheating processing is continued for a preset period of time (for example, 30 seconds) only, and then the processing is finished. If the heating is continued for a long period of time, the battery runs down heavily when the automobile is not in use.

From this point of view, the control unit 15 may be configured so that the remaining amount (residual voltage) of battery is monitored, and when the remaining amount becomes smaller than a preset threshold value, the automatic performance of compressor preheating processing is stopped.

Besides, the configuration may be such that, in the case where the user carries a key having a remote control function, which unlocks the automotive door merely by approaching the automobile, what is called a keyless remote controller, the control unit 15 may perform the compressor preheating processing by using a signal from the keyless remote controller as a trigger. That is to say, when a user carrying a keyless remote controller approaches the automobile, the keyless remote controller and a communication device provided on the automobile side can communicate with each other. After authentication has been accomplished between the keyless remote controller and the communication device on the automobile side to check whether or not the keyless remote controller is correct, a trigger signal for unlocking the automotive door is sent from the keyless remote controller. Upon receipt of this trigger signal, the control unit 15 automatically performs the compressor preheating processing.

At least several seconds is taken from when the communication between the keyless remote controller and the communication device on the automobile side is established to when the user actually opens the door and sits on the driver's seat.

During this time, the performance of compressor preheating processing is started, by which the actuation of compressor is accomplished early.

The compressor preheating processing can be performed by any method.

For example, as disclosed in Patent Document 1 (Japanese Patent Laid-Open No. 2005-326054), the compressor may be preheated by supplying a dc current to the coil of motor stator to generate heat in the coil.

Also, by driving the gate circuit 16 by means of the control of the control unit 15, the voltage supplied from the dc power source may be supplied, as an alternating current, from the switching element 14 to only any one of U phase, V phase, and W phase of the motor 12.

Figure 2A:
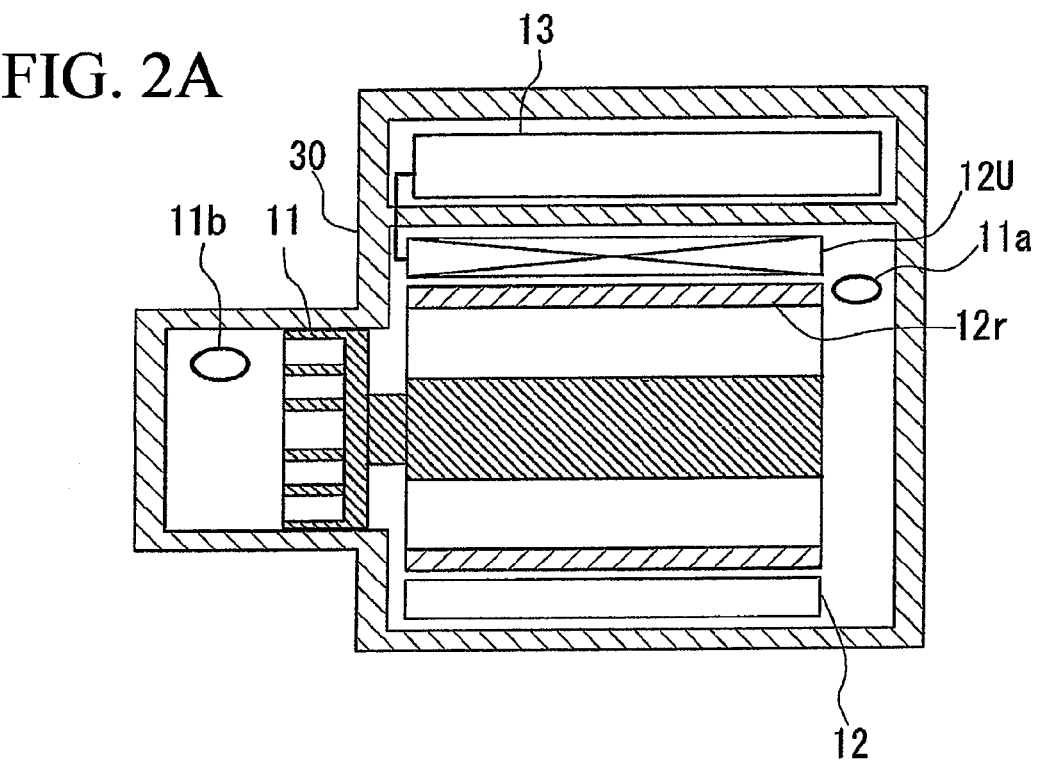
FIG. 2A is a side sectional view of an electric compressor.
Figure 2B:
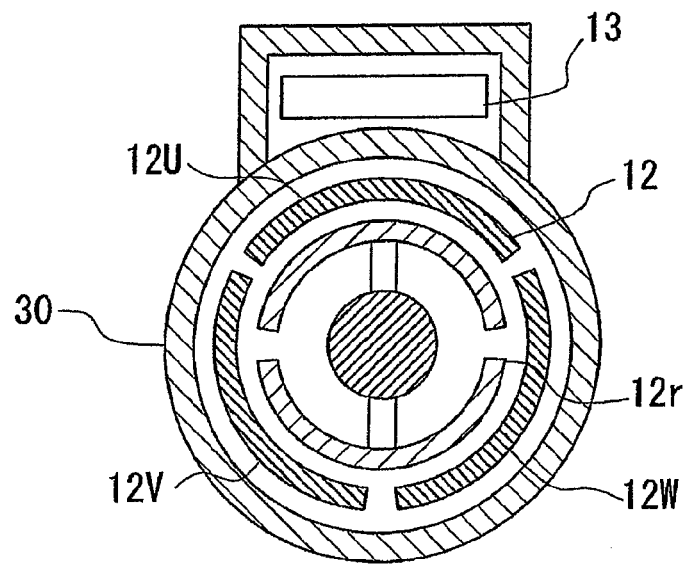
FIG. 2B is a sectional view along a plane perpendicular to the axis of the electric compressor.

FIGS. 2A and 2B are views showing one example of equipment configuration of the electric compressor 10. The electric compressor 10 comprises the scroll compressor body 11, the motor 12, and the control board 13 in a housing 30. In this configuration, by the control of the control unit 15 of the control board 13, an alternating current is supplied to only any one of a U-phase coil 12U, a V-phase coil 12V, and a W-phase coil 12W of the motor 12. In this case, a rotor 12r of the motor 12 does not rotate, and of the U-phase coil 12U, V-phase coil 12V, and W-phase coil 12W, a coil to which the current is supplied generates heat, and the compressor body 11 is heated, by which the refrigerant in the vicinity of the compressor body 11 is heated. Also, in the configuration in which an alternating current is supplied to only any one of the U-phase coil 12U, the V-phase coil 12V, and the W-phase coil 12W of the motor 12, a household ac power source can be supplied from the outside as it is, and thereby preheating can be performed.

At this time, to perform preheating more evenly, it is preferable that an alternating current be successively supplied to the U-phase coil 12U, the V-phase coil 12V, and the W-phase coil 12W one after another to perform heating from the whole in the circumferential direction of the motor 12.

Also, from the viewpoint of noise and the like, the alternating current supplied to the U-phase coil 12U, the V-phase coil 12V, and the W-phase coil 12W is preferably a harmonic.

By heating the motor 12 in this manner, the refrigerant especially on the outlet side 11b of the compressor body 11 located near the motor 12 is heated. As a result, the temperature of the refrigerant on the outlet side 11b rises, so that the refrigerant can be prevented from being liquefied, and the automotive air conditioner can be actuated rapidly.

Besides, by rotating the motor 12 at the number of revolutions lower than that at the time of normal operation, the refrigerant on the outlet side 11b of the compressor body 11 is prevented from being liquefied, and this can also be made actuation load reducing processing.

By preventing the refrigerant from being liquefied on the outlet side 11b of the compressor body 11 in this manner during the time when the automotive air conditioner is stopping, the load of the motor 12 at the time when the compressor body 11 is actuated can be reduced, and the automotive air conditioner can be operated quickly. Thereby, the automotive air conditioner can be made effective early, so that the user can enjoy a comfortable cabin space.

In the above description, a plurality of examples of triggers for automatically performing the compressor preheating processing have been cited, and also a plurality of examples of methods for compressor preheating processing have been cited. Needless to say, any configuration other than those described above may be used, or a plurality of kinds of configurations can be used in combination.

Besides, regarding the configuration, the control method, and the like of the electric compressor 10, the configurations described in the above embodiment can be selected or can be changed appropriately without departing from the spirit and scope of the present invention.

The invention claimed is:

1. An electric compressor comprising:
    a compressor body constituting an air conditioner;
    a motor for driving the compressor body; and
    a control section for controlling the operation of the motor, wherein:
    the control section comprises a switching element for supplying an alternating current from a dc power source to each of three-phase coils of the motor to rotationally drive the motor, during the time when the operation of the electric compressor is stopping, the switching element timely supplies the alternating current to only the single-phase coil of the three-phase coils of the motor, and thereby the compressor body is heated, and wherein
    by rotationally driving the motor for a preset period of time, the control section pushes out the refrigerant liquefied on the outlet side of the compressor body.

2. The electric compressor according to claim 1, wherein:
    the electric compressor further comprises a timer,
    during the time when the operation of electric compressor is stopping, the timer delivers a trigger signal to the control unit each time preset time has elapsed.

3. The electric compressor according to claim 1, wherein:
    the electric compressor further comprises a timer,
    during the time when the operation of electric compressor is stopping, the timer delivers a trigger signal to the control unit at every preset time.

4. The electric compressor according to claim 1, wherein:
    the electric compressor further comprises an open-air temperature sensor,
    during the time when the operation of electric compressor is stopping, and in the case where the open-air temperature detected by the open-air temperature sensor is lower than the present temperature value, the switching element supplies the alternating current to only the single-phase coil of the three-phase coils of the motor.

* * * * *